United States Patent
Jin et al.

(10) Patent No.: US 11,115,091 B2
(45) Date of Patent: Sep. 7, 2021

(54) CHANNEL STATE INFORMATION FEEDBACK AND RECEIVING METHODS, TRANSMIT-END DEVICE AND RECEIVE-END DEVICE

(71) Applicant: HUAWEI TECHNOLOGIES CO., LTD., Guangdong (CN)

(72) Inventors: Huangping Jin, Shanghai (CN); Peng Jiang, Shenzhen (CN); Xiaoyan Bi, Shanghai (CN); Wei Han, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/728,388

(22) Filed: Dec. 27, 2019

(65) Prior Publication Data

US 2020/0136693 A1    Apr. 30, 2020

Related U.S. Application Data

(63) Continuation of application No. PCT/CN2018/090137, filed on Jun. 6, 2018.

(30) Foreign Application Priority Data

Jun. 28, 2017    (CN) .......................... 201710510863.7

(51) Int. Cl.
*H04L 27/20* (2006.01)
*H04B 7/0456* (2017.01)
(Continued)

(52) U.S. Cl.
CPC ......... *H04B 7/0478* (2013.01); *H04B 7/0626* (2013.01); *H04B 7/10* (2013.01); *H04L 5/14* (2013.01)

(58) Field of Classification Search
CPC ....... H04B 7/0478; H04B 7/0626; H04B 7/10
(Continued)

(56) References Cited

U.S. PATENT DOCUMENTS

2013/0155891 A1* 6/2013 Dinan ................... H04L 5/0053
370/252
2015/0365150 A1* 12/2015 Kim ..................... H04B 7/0469
375/267
(Continued)

FOREIGN PATENT DOCUMENTS

| CN | 101826951 A | 9/2010 |
| CN | 101958773 A | 1/2011 |

(Continued)

OTHER PUBLICATIONS

Samsung, "Type II CSI reporting", 3GPP TSP RAN WG1 Meeting #88; R1-1702948, XP051220708, Feb. 13-17, 2017, 8 pages, Athens, Greece.*

(Continued)

*Primary Examiner* — Tesfaldet Bocure
(74) *Attorney, Agent, or Firm* — Womble Bond Dickinson (US) LLP (57) ABSTRACT

Embodiments of this application disclose channel state information feedback and receiving methods, a transmit-end device and a receive-end device, and relate to the field of communications technologies. The method includes: generating and sending, by a transmit-end device, codebook indication information of K transport layers, where K is an integer greater than or equal to 2; the codebook indication information includes: L pieces of beam information used by the K transport layers, and indication information used to indicate beam information associated with each of the K transport layers; L is an integer greater than or equal to 2, and a quantity of pieces of beam information associated with at least one of the K transport layers is less than L.

(Continued)

Implementing a channel state information feedback and receiving technology provided in this application helps reduce feedback overheads of channel state information.

20 Claims, 3 Drawing Sheets

(51) Int. Cl.
  *H04B 7/06* (2006.01)
  *H04B 7/10* (2017.01)
  *H04L 7/00* (2006.01)
  *H04L 5/14* (2006.01)

(58) Field of Classification Search
  USPC .......................... 375/267, 299, 358; 455/101
  See application file for complete search history.

(56) References Cited

U.S. PATENT DOCUMENTS

| | | | |
|---|---|---|---|
| 2017/0289832 A1 | 10/2017 | Kim et al. | |
| 2018/0167116 A1 | 6/2018 | Rahman et al. | |
| 2019/0115960 A1* | 4/2019 | Jiang | H04B 7/0626 |
| 2019/0260434 A1* | 8/2019 | Park | H04B 7/0456 |
| 2020/0244330 A1* | 7/2020 | Jin | H04B 7/065 |
| 2020/0403656 A1* | 12/2020 | Cheraghi | H04B 7/0452 |

FOREIGN PATENT DOCUMENTS

| | | | |
|---|---|---|---|
| CN | 104604285 A | 5/2015 | |
| CN | 105991238 A | 10/2016 | |
| CN | 106160926 A | 11/2016 | |
| CN | 106685496 A | 5/2017 | |
| EP | 3533156 A1 | 9/2019 | |
| WO | 2014198037 A1 | 12/2014 | |
| WO | 2017101040 A1 | 6/2017 | |

OTHER PUBLICATIONS

Samsung, "Type II CSI reporting", 3GPP TSG RAN WG1 Meeting #88bis, R1-1705349, XP051250918, Apr. 3-7, 2017,12 pages, Spokane, USA.*

LG Electronics: "Discussion on CSI feedback Type 1",3GPP Draft; R1-1707610,May 14, 2017 (May 14, 2017), XP051272818,total 14 pages.

Beijing Xinwei Telecom Techn,"Further Discussion of CSI Report for FD-MIMO",3GPP TSG RAN WG1 Meeting #83 R1-156496,Anaheim, USA, Nov. 15-22, 2015,total 6 pages.

* cited by examiner

CHANNEL STATE INFORMATION FEEDBACK AND RECEIVING METHODS, TRANSMIT-END DEVICE AND RECEIVE-END DEVICE

CROSS-REFERENCE TO RELATED APPLICATIONS

This application is a continuation of International Application No. PCT/CN2018/090137, filed on Jun. 6, 2018, which claims priority to Chinese Patent Application No. 201710510863.7, filed on Jun. 28, 2017 The disclosures of the aforementioned applications are hereby incorporated by reference in their entireties.

TECHNICAL FIELD

This application relates to the field of communications technologies, and in particular, to channel state information feedback and receiving methods, a transmit-end device and a receive-end device.

BACKGROUND

Massive multiple-input multiple-output (MIMO) is one of 5G key technologies widely accepted in the industry. Spectral efficiency is significantly improved by using a large-scale antenna.

Accuracy of channel state information (CSI) obtained by a base station determines performance of Massive MIMO to a great extent. In a time division duplex (TDD) system or a frequency division duplex (FDD) system in which channel reciprocity cannot be well satisfied, CSI is usually quantized by using a codebook. Therefore, a codebook design is a key problem of Massive MIMO and a problem needing to be resolved in this application.

In a long term evolution (LTE) system, a beam combination technology is usually as follows: A plurality of code words are selected from a predefined codebook, and a weight sum of the plurality of code words is used as a precoding vector. Generally, one code word corresponds to one beam direction. To be specific, a plurality of optimal code words are selected from a plurality of candidate code words and weighting coefficients (namely, beam superposition coefficients) of the plurality of code words are reported as CSI information in a form of precoding matrix indicators (PMI). New radio (NR) Massive MIMO has a higher requirement on a channel state information feedback, and the foregoing mechanism cannot satisfy a requirement of NR for reducing signaling overheads.

SUMMARY

To satisfy an NR Massive MIMO system requirement for a channel state information feedback, this application provides channel state information feedback and receiving methods, a transmit-end device and a receive-end device.

This application provides a channel state information feedback method, including: generating, by a transmit-end device, codebook indication information of K transport layers, where K is an integer greater than or equal to 2; the codebook indication information includes: L pieces of beam information used by the K transport layers, and indication information used to indicate beam information associated with each of the K transport layers; L is an integer greater than or equal to 2, and a quantity of pieces of beam information associated with at least one of the K transport layers is less than L; and sending, by the transmit-end device, the codebook indication information of the K transport layers. Receiving, by the receive-end device, the codebook indication information of the K transport layers, and generating a precoding vector of each of the K transport layers according to the codebook indication information of the K transport layers. The beam information is used to indicate information about a beam, for example, but not limited to an index of a beam. In this application, one beam corresponds to one piece of beam information. L pieces of beam information used by the K transport layers are L pieces of beam information used by the receive-end device to construct the K transport layers. However, for any transport layer, the receive-end device may use one or more of the L pieces of beam information to construct the precoding vector of the transport layer. Beam information associated with a transport layer is beam information used by the receive-end device to construct the precoding vector of the transport layer. In this technical solution, for at least one of K transport layers, the quantity of pieces of beam information associated with the transport layer is less than a transport layer quantity L used by the K transport layers. When the codebook indication information is reported, the beam information associated with each of the transport layer needs to be reported, and sequences of reporting the beam information associated with different layers may be the same or different. In a possible implementation, the quantity of pieces of beam information associated with a transport layer in m transport layers is L. However, coefficients of some beams therein may be 0. For example: the transport layer quantity K is equal to 8, these eight transport layers each use four beams, and coefficients of four beams of each of some transport layers are not zero, and a coefficient of at least one beam of each of some transport layers is zero. When a feedback is performed, only a beam whose feedback coefficient is not zero may be fed back, so that a quantity of beam superposition coefficients that are fed back is reduced, thereby helping reduce feedback overheads of channel state information.

Correspondingly, this application further provides a transmit-end device, including: a processor and a transceiver. The processor is configured to generate codebook indication information of K transport layers, where K is an integer greater than or equal to 2; the codebook indication information of the K transport layers includes: L pieces of beam information used by the K transport layers, and indication information used to indicate beam information associated with each of the K transport layers; L is an integer greater than or equal to 2, and a quantity of pieces of beam information associated with at least one of the K transport layers is less than L. The transceiver is configured to send the codebook indication information of the K transport layers.

In another aspect, this application further provides a receive-end device, including: a processor and a transceiver. The transceiver is configured to receive codebook indication information of K transport layers, where K is an integer greater than or equal to 2; the codebook indication information of the K transport layers includes: L pieces of beam information used by the K transport layers, and indication information used to indicate beam information associated with each of the K transport layers; L is an integer greater than or equal to 2, and a quantity of pieces of beam information associated with at least one of the K transport layers is less than L. The processor is configured to determine a precoding vector of each of the K transport layers according to the codebook indication information of the K transport layers.

In one embodiment, the transmit-end device may be a network device, for example, a base station or may be a terminal; and the receive-end device may be a terminal, or may be a network device, for example, a base station.

In one embodiment, in m transport layers in K transport layers, the quantity of pieces of beam information associated with each layer is greater than or equal to 2, that is, 2≤the quantity of pieces of beam information associated with each of m transport layers≤L, where 1≤m≤K, and m is an integer. The quantity of pieces of beam information associated with each of K−m transport layers is equal to 1. For each of the m transport layers, it is considered that the precoding vector of the transport layer is obtained by using a beam combining technology. For each of the K−m transport layers, it may be considered that the precoding vector of the transport layer is obtained by using a technology similar to the beam combining technology.

In one embodiment, for each of the m transport layers, the receive-end device can determine a precoding vector of the transport layer based on at least two pieces of beam information associated with the transport layer and a beam superposition coefficient of the transport layer. This application does not limit an implementation in which the receive-end device obtains the beam superposition coefficient of any transport layer. Optionally, the beam superposition coefficient of at least one of the m transport layers may be carried in the codebook indication information of the K transport layers, to be transmitted. Optionally, the beam superposition coefficient of at least one of the m transport layers may be obtained based on beam superposition coefficients of other one or more transport layers. This application is not limited thereto. The beam superposition coefficient may include, for example, but is not limited to at least one of the following coefficients: a broadband amplitude coefficient, a narrowband amplitude coefficient and a narrowband phase coefficient.

In one embodiment, in m transport layers, the quantity of pieces of beam information associated with each of the m transport layers is equal, or quantities of pieces of beam information associated with at least two of the m transport layers are not equal. In an embodiment, the quantity of pieces of beam information associated with each of m transport layers is L. For each of the m transport layers, the receive-end device can determine a precoding vector of the transport layer based on L pieces of beam information associated with the transport layer and a beam superposition coefficient of the transport layer. In another embodiment, the quantity of pieces of beam information associated with at least one of the m transport layers is L, and the quantity of pieces of beam information associated with each of other transport layers is less than L. For each of at least one of the m transport layers, the receive-end device can determine a precoding vector of the transport layer based on L pieces of beam information associated with the transport layer and a beam superposition coefficient of the transport layer; for each of other transport layers in the m transport layers, the receive-end device can determine a precoding vector of the transport layer based on less than L pieces of beam information associated with the transport layer and a beam superposition coefficient of the transport layer.

In one embodiment, for each of the K−m transport layers, the receive-end device can determine a precoding vector of the transport layer based on one piece of beam information associated with the transport layer and a polarization phase difference for constructing a precoding vector of the transport layer. In an embodiment, for each of the K−m transport layers, beam information associated with the transport layer is beam information of a strongest beam. In the embodiment, for each of the K−m transport layers, the receive-end device can determine the precoding vector of the transport layer based on the beam information of the strongest beam of the transport layer and the polarization phase difference for constructing the precoding vector of the transport layer.

In one embodiment, for one of the K−m transport layers, a polarization phase difference for constructing a precoding vector of the transport layer is associated with a beam superposition coefficient of one of the m transport layers. In one embodiment, a polarization phase difference φ for constructing a precoding vector of a $y^{th}$ transport layer in the K−m transport layers is obtained by using any one of the following formulas:

$$\phi = -\frac{\alpha_{0,x,v}^{WB} p_{0,x,v}^{SB} c_{1,x,v}^{SB}}{\alpha_{1,x,v}^{WB} p_{1,x,v}^{SB} c_{0,x,v}^{SB}}, \phi = -\frac{\alpha_{0,x,v}^{WB} c_{1,x,v}^{SB}}{\alpha_{1,x,v}^{WB} c_{0,x,v}^{SB}}, \text{and/or } \phi = -\frac{p_{0,x,v}^{SB} c_{1,x,v}^{SB}}{p_{1,x,v}^{SB} c_{0,x,v}^{SB}}.$$

$\alpha_{i,x,v}^{WB}$ is a broadband amplitude coefficient of a beam $b_v$ of a polarization direction i of an $x^{th}$ transport layer of the m transport layers, $\alpha_{i,x,v}^{SB}$ is a narrowband amplitude coefficient of the beam $b_v$ of the polarization direction i of the $x^{th}$ transport layer of the m transport layers, $c_{i,x,v}^{SB}$ is a narrowband phase coefficient of the beam $b_v$ of the polarization direction i of the $x^{th}$ transport layer of the m transport layers; i is 0 or 1; 0<x≤m, and 0<y≤K−m.

In an embodiment, polarization phase differences for constructing precoding vectors of different transport layers in K−m transport layers are associated with beam superposition coefficients of different transport layers in m transport layers. In another embodiment, polarization phase differences for constructing precoding vectors of different transport layers in K−m transport layers are associated with the beam superposition coefficient of the same transport layer in m transport layers. These two embodiments can be combined. For example, polarization phase differences for constructing precoding vectors of two of K−m transport layers are associated with beam superposition coefficients of two different transport layers in m transport layers; polarization phase differences for constructing precoding vectors of another two of K−m transport layers are associated with the beam superposition coefficient of the same transport layer in m transport layers. Certainly, these two embodiments may be independently used.

In another embodiment, a polarization phase difference for constructing a precoding vector of each of K−m transport layers is associated with the beam superposition coefficient of the same transport layer in m transport layers, so that it is helpful to realize pairwise orthogonalization of all beams by properly setting the polarization phase difference for constructing the precoding vector of each of the K−m transport layers, thereby reducing interference between transport layers.

In one embodiment, the manner provided in the foregoing for obtaining the polarization phase difference for constructing the precoding vector of any one of the K−m transport layers may be predetermined by the transmit-end device and the receive-end device, or may be carried in the codebook indication information of the K transport layers, to be transmitted. This is not limited in this application.

In one embodiment, the quantity of pieces of beam information associated with each of K transport layers is greater than or equal to 2. In this case, for each of the K transport layers, it is considered that the precoding vector of the transport layer is obtained by using the beam combining technology. Optionally, for each of the K transport layers, the receive-end device can determine a precoding vector of the transport layer based on at least two pieces of beam information associated with the transport layer and a beam superposition coefficient of the transport layer. In another embodiment, 2≤the quantity of pieces of beam information associated with each of at least one of K transport layers<L, and the quantity of pieces of beam information associated with each of other transport layers is equal to L. For each of at least one of the K transport layers, the receive-end device can determine a precoding vector of the transport layer based on less than L pieces of beam information associated with the transport layer and a beam superposition coefficient of the transport layer. For each of the other transport layers in the K transport layers, the receive-end device can determine a precoding vector of the transport layer based on L pieces of beam information associated with the transport layer and a beam superposition coefficient of the transport layer.

According to another aspect, an embodiment of this application provides a base station. The base station has a function of implementing behavior of the base station in the foregoing method designs. The function may be implemented by hardware, or may be implemented by hardware executing corresponding software. The hardware or software includes one or more modules corresponding to the foregoing function.

In one embodiment, a structure of the base station includes a processor and a transceiver, where the processor is configured to support the base station in performing corresponding functions in the foregoing method. The transceiver is configured to: support communication between the base station and a terminal, send, to the terminal, information or signaling used in the foregoing method, and receive information or an instruction that is sent by the base station. The base station may further include a memory. The memory is configured to: couple to the processor, and store a necessary program instruction and data of the base station.

According to still another aspect, an embodiment of this application provides a terminal. The terminal has a function of implementing behavior of the terminal in the foregoing method designs. The functions may be implemented by hardware, and a structure of the terminal includes a transceiver and a processor. The functions may alternatively be implemented by hardware executing corresponding software. The hardware or software includes one or more modules corresponding to the foregoing function. The module may be software and/or hardware.

According to still another aspect, an embodiment of this application provides a control node. The control node may include a controller/processor, a memory, and a communications unit. The controller/processor may be configured to coordinate resource management and configuration between a plurality of base stations, and may be configured to perform the channel state information feedback method described in the foregoing embodiment. The memory may be configured to store program code and data of the control node. The communications unit is configured to support communication between the control node and a base station, for example, send information about a configured resource to the base station.

According to still another aspect, the transmit-end device and the receive-end device may be a chip including a processor and an interface. When being implemented by hardware, the processor may be a logical circuit, an integrated circuit, or the like. When being implemented by software, the processor may be a general-purpose processor that is implemented by reading software code stored in a memory, and the memory may be integrated in the processor, or may be located outside the processor, and exist independently.

According to still another aspect, an embodiment of this application provides a communications system. The system includes the base station and the terminal that are described in the foregoing aspects. Optionally, the communications system may further include the control node in the foregoing embodiments.

According to yet another aspect, an embodiment of this application provides a computer storage medium, configured to store a computer software instruction used by the foregoing base station. The computer storage medium includes a program designed for executing the foregoing aspects.

According to yet another aspect, an embodiment of this application provides a computer storage medium, configured to store computer software instructions used by the foregoing terminal. The computer storage medium includes a program designed for executing the foregoing aspects.

A beneficial effect of the technical solution provided in this application is: for the at least one of K transport layers, the quantity of pieces of beam information associated with the transport layer is less than the transport layer quantity L used by the K transport layers. Therefore, the quantity of beam superposition coefficient fed back by the transmit-end device is reduced, thereby helping reduce the feedback overheads of the channel state information.

DESCRIPTION OF EMBODIMENTS

The following describes technical solutions provided in the embodiments of this application in detail with reference to accompanying drawings.

Figure 1:
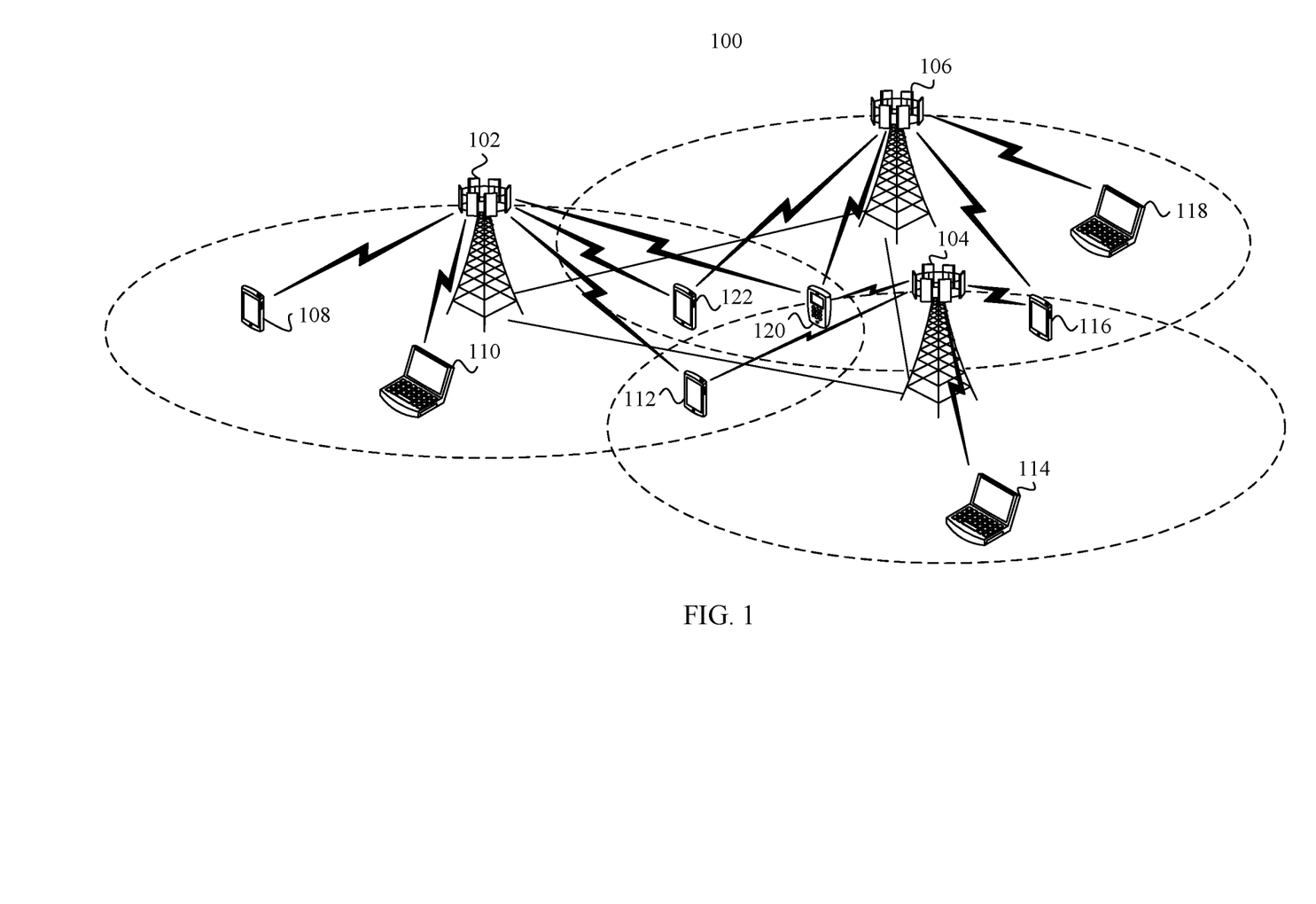
FIG. 1 is a schematic diagram of a wireless communications network applicable to a technical solution according to this application.

FIG. 1 is a schematic diagram of a wireless communications network 100 applicable to a technical solution according to this application. As shown in FIG. 1, the wireless communications network 100 includes base stations 102 to 106 and terminal devices 108 to 122. The base stations 102 to 106 may communicate with each other by using a backhaul link (shown as a straight line between the base stations 102 to 106), and the backhaul link may be a wired backhaul link (for example, an optical fiber or a copper cable), or may be a wireless backhaul link (for example, a microwave). The terminal devices 108 to 122 may communicate with corresponding base stations 102 to 106 by using a radio link (shown as polygonal lines between the base stations 102 to 106 and the terminal devices 108 to 122).

The base stations 102 to 106 are configured to provide wireless access services to the terminal devices 108 to 122. Specifically, each base station corresponds to a service coverage area (which may be referred to as a cellular, shown in an oval area in FIG. 1), and a terminal device entering the area may communicate with the base stations by using a radio signal, to receive the wireless access services provided by the base stations. Service coverage areas of the base stations may overlap, and a terminal device in an overlapped area may receive radio signals from a plurality of base stations. Therefore, the terminal device may be served by a plurality of base stations at the same time. For example, the plurality of base stations may provide the service for the terminal device in the overlapped area by using a coordinated multipoint (CoMP) technology. For example, as shown in FIG. 1, service coverage areas of the base station 102 and the base station 104 overlap, and a terminal device 112 is located in the overlapped area. Therefore, the terminal device 112 may receive radio signals from the base station 102 and the base station 104, and the base station 102 and the base station 104 may coordinate with each other to provide a service for the terminal device 112. For another example, as shown in FIG. 1, service coverage areas of the base station 102, the base station 104, and the base station 106 have a same overlapped area, and a terminal device 120 is located in the overlapped area. Therefore, the terminal device 120 may receive radio signals from the base station 102, the base station 104, and the base station 106, and the base station 102, the base station 104, and the base station 106 may coordinate with each other and provide a service for the terminal device 120.

Depending on a used wireless communications technology, a base station may also be referred to as a node B (NodeB), an evolved node B (eNodeB), an access point (AP), or the like. In addition, according to a size of coverage of services provided by base stations, the base stations may be classified into macro base stations used to provide macro cells, micro base stations used to provide pico cells, and femto base stations used to provide femto cells. With evolution of the wireless communications technologies, the base stations may have other names in the future.

The terminal devices 108 to 118 are devices having a wireless transmission and receiving function and may be deployed on land, including an indoor or outdoor device, a handheld device, a wearable device, or a vehicle-mounted device, may be deployed on water surface (for example, in a ship), or may be deployed in air (for example, on an airplane, in a balloon, or on a satellite). The terminal device may be a mobile phone, a tablet computer (Pad), a computer having a wireless sending and receiving function, a virtual reality (VR) terminal device, an augmented (AR) terminal device, a wireless terminal in industrial control, a wireless terminal in unmanned driving, a wireless terminal in remote medicine, a wireless terminal in a smart grid, a wireless terminal in transportation safety, a wireless terminal in a smart city, a wireless terminal in a smart home, or the like. This embodiment of this application imposes no limitation on an application scenario. The terminal device sometimes may also be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

The base stations 102 to 106 and the terminal devices 108 to 122 all may be configured with a plurality of antennas, to support a multiple-input multiple-output (MIMO) technology. Further, the base stations 102 to 106 may support a single-user MIMO (SU-MIMO) technology, and support a multi-user MIMO (MU-MIMO) technology. The MU-MIMO technology may be implemented based on a space division multiple access (SDMA) technology. Provided with the plurality of antennas, the base stations 102 to 106 and the terminal devices 108 to 122 may alternatively flexibly support a single-input single-output (SISO) technology, a single-input multiple-output (SIMO) technology, and a multiple-input single-output (MISO) technology, to implement various diversity (not limited to, for example, transmit diversity and receive diversity) and multiplexing technologies. The diversity technology may include but is not limited to a transmit diversity (TD) technology or a receive diversity (RD) technology, and the multiplexing technology may be a spatial multiplexing technology. Moreover, the foregoing technologies may further include various implementation solutions. For example, the transmit diversity technology may include but is not limited to diversity manners, for example, space-time frequency transmit diversity (STTD), space-frequency transmit diversity (SFTD), time switched transmit diversity (TSTD), frequency switched transmit diversity (FSTD), orthogonal transmit diversity (OTD), cyclic delay diversity (CDD), and a diversity manner obtained after the foregoing diversity manners are derived, evolved, and combined. For example, in a current LTE standard, transmit diversity manners such as a space-time block coding (STBC), space frequency block coding (SFBC) and CDD are used.

Moreover, the base stations 102 and the terminal devices 104 to 110 may perform communication by using various wireless communications technologies. The wireless communications technologies are not limited to, for example, a time division multiple access (TDMA) technology, a frequency division multiple access (FDMA) technology, code division multiple access (CDMA) technology, time division-synchronous code division multiple access (TD-SCDMA), an orthogonal frequency division multiple access (OFDMA) technology, a single carrier frequency division multiple access (SC-FDMA) technology, a space division multiple access (SDMA) technology, and an evolved and derived technology of the technologies. The foregoing wireless communications technologies are used in various wireless communication standards as a radio access technology (RAT), to construct various wireless communications systems (or networks) currently well-known by people. The wireless communications system may include but is not limited to a global system for mobile communications (GSM), CDMA2000, wideband CDMA (WCDMA), WiFi defined in the 802.11 serial standards, worldwide interoperability for microwave access (WiMAX), long term evolution (LTE), LTE-advanced (LTE-A), an evolved system of the wireless communications systems, and the like. The wireless communications network shown in FIG. 1 may be any system or network of the wireless communications system. Unless particularly stated, the technical solutions provided in the embodiments of this application may be applied to the various wireless communications technologies and the wireless communications system described above. In addition, the terms "system" and "network" may be interchanged.

It should be noted that, the wireless communications network 100 shown in FIG. 1 is merely used for description, and is not used to limit the technical solutions of this application. A person skilled in the art should understand that, in a specific implement process, the wireless communications network 100 may include another device, and quantities of the base stations and the terminal devices may be configured according to specific requirements.

In the wireless communications network 100, if a network device, for example, a base station, needs to obtain channel state information, a terminal is required to report accurate CSI, and usually reports the channel state information to the base station in a form of a precoding codebook.

Before describing implementations of this application in detail, the precoding codebook is first described as follows. In addition, the related art of this application is described in Chinese Application No. 201710284175.3, entitled "PRECODING VECTOR INDICATING AND DETERMINING METHOD AND DEVICE", which can serve as reference in its entirety.

Based on a high accuracy CSI feedback of a beam combination mechanism, the precoding codebook may be represented as a two-level codebook structure:

$$W = W_1 \times W_2$$

$W_1$ includes a beam index and a broadband superposition coefficient required to be fed back, and $W_2$ includes a narrowband superposition coefficient. The broadband superposition coefficient corresponds to broadband amplitude quantization; the narrowband superposition coefficient corresponds to narrowband amplitude quantization and narrowband phase quantization.

The following is a simple example of a two-level codebook form:

$$W = W_1 W_2 = \begin{bmatrix} p_0 b_0, p_1 b_1, p_2 b_2, p_3 b_3 & 0 \\ 0 & p_4 b_0, p_5 b_1, p_6 b_2, p_7 b_3 \end{bmatrix}$$

$$\begin{bmatrix} c_0 \\ c_1 \\ c_2 \\ c_3 \\ c_4 \\ c_5 \\ c_6 \\ c_7 \end{bmatrix} = \begin{bmatrix} p_0 c_0 b_0 + p_1 c_1 b_1 + p_2 c_2 b_2 + p_3 c_3 b_3 \\ p_4 c_4 b_0 + p_5 c_5 b_1 + p_6 c_6 b_2 + p_7 c_7 b_3 \end{bmatrix}$$

$$\begin{bmatrix} c_0 \\ c_1 \\ c_2 \\ c_3 \\ c_4 \\ c_5 \\ c_6 \\ c_7 \end{bmatrix}$$

is obtained by combining $$\begin{bmatrix} \alpha_0 \\ \alpha_1 \\ \alpha_2 \\ \alpha_3 \\ \alpha_4 \\ \alpha_5 \\ \alpha_6 \\ \alpha_7 \end{bmatrix} \text{ and } \begin{bmatrix} \theta_0 \\ \theta_1 \\ \theta_2 \\ \theta_3 \\ \theta_4 \\ \theta_5 \\ \theta_6 \\ \theta_7 \end{bmatrix}.$$

In the example, $p_0$ to $p_7$ are broadband superposition coefficients included in $W_1$, and represent broadband amplitude quantization. $\alpha_0$ to $\alpha_7$ and $\theta_0$ to $\theta_7$ are narrowband amplitude quantization and narrowband phase quantization that are combined to be a narrowband superposition coefficient included in $W_2$.

The solution describes a precoding codebook corresponding to one transport layer (rank 1). For precoding codebooks of K transport layers (rank-K), the $W_2$ codebook matrix is K columns, and corresponding $W_2$ feedback overheads will be K times of rank 1.

Specifically, for the precoding codebooks of the K transport layers (rank-K), a codebook of one transport layer may be represented as:

$$W = W_1 W_2 = \begin{bmatrix} \alpha_0^{WB} b_0, \alpha_1^{WB} b_1, \ldots, \alpha_{L-1}^{WB} b_{L-1} & 0 \\ 0 & \alpha_L^{WB} b_0, \alpha_{L+1}^{WB} b_1, \ldots, \alpha_{2L-1}^{WB} b_{L-1} \end{bmatrix} \begin{bmatrix} p_0^{SB} c_0^{SB} \\ p_1^{SB} c_1^{SB} \\ \vdots \\ p_{2L-1}^{SB} c_{2L-1}^{SB} \end{bmatrix} \quad \text{Formula 1}$$

where $b_i$ is a beam used to represent CSI selection when the beam combining method is used, $\alpha_i^{WB}$ is a broadband amplitude coefficient, $p_i^{SB}$ is a narrowband amplitude coefficient, and $c_i^{SB}$ is a narrowband phase coefficient, where $0 \leq i < L$, and L is a quantity of beams used by each transport layer.

If codebook elements corresponding to each transport layer are independently quantized, feedback overheads are sharply increased. Therefore, to reduce the overheads, in the LTE system, usually the beam information of a same group of beams $b_i$ is used to construct a precoding vector of each of the K transport layers, that is, the precoding vectors of each transport layer of K transport layers are constructed by using beam information of all beams of the same group of beams $b_i$. Although the overheads are reduced to some extent, the transmit-end device is required to feed back the beam superposition coefficients of all beams used to construct each of the transport layers. Therefore, when there is a large quantity of transport layers, the feedback overheads are still large.

It should be noted that, the precoding codebook can be considered as an ideal precoding vector in Application No. 201710284175.3, entitled "PRECODING VECTOR INDICATING AND DETERMINING METHOD AND DEVICE".

Figure 2:
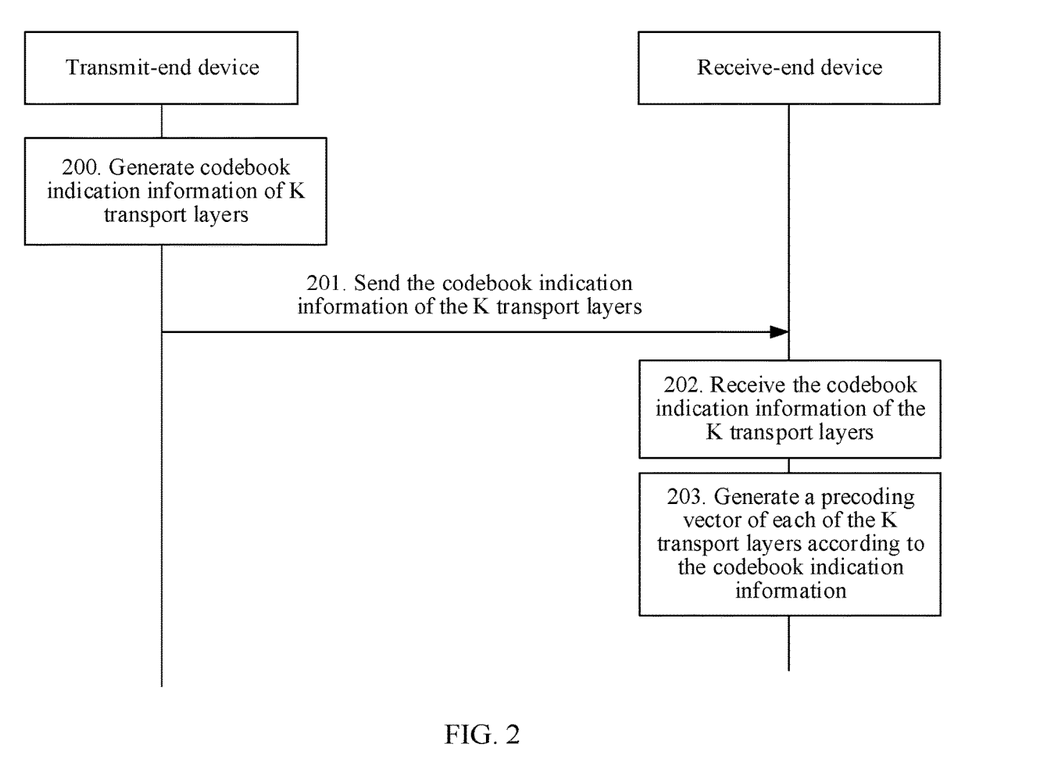
FIG. 2 is a schematic flowchart of channel state information feedback and receiving methods according to this application.

This application provides channel state information feedback and receiving methods that can realize low overheads. Specifically, in the wireless communications network 100, this application provides channel state information feedback and receiving methods. As shown in FIG. 2, the methods include the following operations.

Operation 200. A transmit-end device generates codebook indication information of K transport layers, where K is an integer greater than or equal to 2; the codebook indication information of the K transport layers includes: L pieces of beam information used by the K transport layers, and indication information used to indicate beam information associated with each of the K transport layers; L is an integer greater than or equal to 2, and a quantity of pieces of beam information associated with at least one of the K transport layers is less than L.

L pieces of beam information used by the K transport layers may be configured to indicate a group of beams $b_0$ to $b_{L-1}$. The beam information is used to indicate information about a beam, for example, but is not limited to an index of a beam. In this application, one beam corresponds to one piece of beam information. L pieces of beam information used by the K transport layers are L pieces of beam information used by the receive-end device to construct the K transport layers. However, for any transport layer, the receive-end device may use one or more of the L pieces of beam information to construct the precoding vector of the transport layer. Beam information associated with a transport layer is beam information used by the receive-end device to construct the precoding vector of the transport layer. This application does not limit a specific implementation of indication information used to indicate beam information associated with each of K transport layers.

Beam information associated with K transport layers may be used by a receive-end device to obtain a precoding vector of each of K transport layers. In this application, for at least one of K transport layers, some beams of the group of beams $b_0$ to $b_{L-1}$ are used to construct codebooks. Quantities of pieces of beam information associated with different transport layers may be the same, or may be different. Using an example in which L beams are $b_0$ to $b_3$, a transport layer quantity K is equal to 4 and transport layers are marked as transport layers 0 to 3, in an example, beam information associated with the transport layer 0 may be beam information of $b_0$ to $b_3$, beam information associated with the transport layer 1 may be beam information of $b_0$ to $b_2$, beam information associated with the transport layer 2 may be beam information of $b_0$ to $b_1$, and beam information associated with the transport layer 3 may be beam information of $b_0$ to $b_1$. In another example, beam information associated with the transport layers 0 and 1 may all be beam information of $b_0$ and $b_2$, beam information associated with the transport layers 2 and 3 may all be beam information of $b_1$ and $b_3$. In another example, all beam information associated with the transport layers 0, 1 and 2 are beam information of $b_0$ to $b_3$, beam information associated with the transport layer 3 is beam information of $b_0$. Certainly, this application is not limited thereto.

Operation 201. The transmit-end device sends the codebook indication information of the K transport layers.

The codebook indication information of the K transport layers may be PMI, or may be other information. The codebook indication information to transmit K transport layers can be carried in one or more messages. This application is not limited thereto.

Operation 202. A receive-end device receives the codebook indication information of the K transport layers.

Operation 203. The receive-end device generates a precoding vector of each of the K transport layers according to the codebook indication information of the K transport layers. For a related description of this operation, refer to the following. Details are not described herein again.

In the technical solution provided by this application, for at least one of K transport layers, a quantity of pieces of beam information associated with the transport layer is less than a transport layer quantity L used by K transport layers. Therefore, a quantity of beam superposition coefficients that are fed back is reduced, thereby helping reduce feedback overheads of channel state information.

In some embodiments of this application, the quantity of pieces of beam information associated with each of m transport layers in K transport layers is greater than or equal to 2, that is, 2≤the quantity of pieces of beam information associated with each of m transport layers≤L, where 1≤m<K, and m is an integer. The quantity of pieces of beam information associated with each of K−m transport layers is equal to 1. It should be noted that, K−m transport layers described herein means other transport layers other than the m transport layers in the K transport layers.

The quantity of pieces of beam information associated with each of m transport layers is greater than or equal to 2. In other words, a precoding vector of each of the m transport layers is constructed by using at least two pieces of beam information. Therefore, for each of the m transport layers, it is considered that the precoding vector of the transport layer is obtained by using a beam combining technology. The m transport layers described in this application may be any m transport layers in K transport layers. Optionally, the m transport layers may be m transport layers with strong equivalent channel qualities in the K transport layers.

To enable the receive-end device to obtain the precoding vector, the codebook indication information of the K transport layers may further includes: beam superposition coefficient information of at least one of m transport layers. The beam superposition coefficient of the at least one of m transport layers may be carried in the codebook indication information of the K transport layers, to be transmitted. Optionally, beam superposition coefficient of transport layers other than the at least one of m transport layers may be obtained by the receive-end device based on the beam superposition coefficient of the at least one transport layer, and beam reference information of the other transport layers. In the embodiment, the codebook indication information of the K transport layers may also include: beam reference information of other transport layers. For related descriptions of the embodiment, refer to Application No. 201710459667.1, entitled "CHANNEL STATE INFORMATION FEEDBACK AND RECEIVING METHODS AND DEVICE". Details are not described herein again. Certainly, this application is not limited thereto.

For each of the m transport layers, the receive-end device can determine a precoding vector of the transport layer based on at least two pieces of beam information associated with the transport layer and a beam superposition coefficient of the transport layer. For each of the m transport layers, the beam superposition coefficient may include, for example, but is not limited to at least one of the following coefficients: a broadband amplitude coefficient, a narrowband amplitude coefficient and a narrowband phase coefficient. In some codebook structures, a beam superposition coefficient includes: a broadband amplitude coefficient, a narrowband amplitude coefficient and a narrowband phase coefficient. In some other codebook structures, a beam superposition coefficient includes: a broadband amplitude coefficient and a narrowband phase coefficient. In still some other codebook structures, a beam superposition coefficient includes: a narrowband amplitude coefficient and a narrowband phase coefficient.

For example, if the beam superposition coefficient includes the broadband amplitude coefficient, the narrowband amplitude coefficient and the narrowband phase coefficient, for any one of the m transport layers, the receive-end device can determine a precoding vector of the transport layer based on at least two pieces of beam information associated with the transport layer and the broadband amplitude coefficient, the narrowband amplitude coefficient and the narrowband phase coefficient of the transport layer. In this case, for representation of the precoding vector, refer to the formula 1.

For example, if the beam superposition coefficient includes the broadband amplitude coefficient and the narrowband phase coefficient, for any one of the m transport layers, the receive-end device can determine a precoding vector of the transport layer based on at least two pieces of beam information associated with the transport layer and the broadband amplitude coefficient and the narrowband phase coefficient of the transport layer. In this case, for representation of the precoding vector, refer to a formula obtained by assigning each narrowband amplitude coefficient in the formula 1 in the foregoing to 1.

For example, if the beam superposition coefficient includes the narrowband amplitude coefficient and the narrowband phase coefficient, for any one of the m transport layers, the receive-end device can determine a precoding vector of the transport layer based on at least two pieces of beam information associated with the transport layer and the narrowband amplitude coefficient and the narrowband phase coefficient of the transport layer. In this case, for representation of the precoding vector, refer to a formula obtained by assigning each broadband amplitude coefficient in the formula 1 in the foregoing to 1.

In one embodiment, the quantity of pieces of beam information associated with each of m transport layers may be the same. Alternatively, the quantity of pieces of beam information associated with at least two of m transport layers may be different. In an embodiment, the quantity of pieces of beam information associated with each of m transport layers is equal to L. In this case, for each of the m transport layers, a precoding vector of the transport layer is determined based on L pieces of beam information associated with the transport layer and a beam superposition coefficient of the transport layer. In another embodiment, the quantity of pieces of beam information associated with at least one of the m transport layers is equal to L, and the quantity of pieces of beam information associated with each of other transport layers is less than L. In this case, for the at least one of the m transport layers, a precoding vector of the transport layer is determined based on L pieces of beam information associated with the transport layer and a beam superposition coefficient of the transport layer. For each of the other transport layers in the m transport layers, a precoding vector of the transport layer is determined based on less than L pieces of beam information associated with the transport layer and a beam superposition coefficient of the transport layer.

The quantity of pieces of beam information associated with K−m transport layers is equal to 1. In other words, a precoding vector of one of K−m transport layers may be constructed by using one beam of the group of beams $b_0$ to $b_{L-1}$. For each of the K−m transport layers, it is considered that the precoding vector of the transport layer is obtained by using a technology similar to the technology that is based on beam combining. Obtaining a precoding vector of one transport layer based on beam selection is to select a single code word from a predefined codebook, and generally, one code word corresponds to one beam direction, that is, one optimal code word is selected from a plurality of candidate code words and is reported as CSI information in the form of PMI, so that the receive-end device obtains the precoding vector. Different from the existing beam selection technology, in this application, one piece of beam information associated with each of K−m transport layers is not limited to be the beam information of the optimal beam selected from L pieces of beam information of the transport layer. In other words, it is not limited to select one optimal code word from a plurality of candidate code words to report as CSI information in the form of PMI. Optionally, one piece of beam information associated with each of the K−m transport layers is beam information of a strongest beam (that is, an optimal beam) of the transport layer. It should be noted that, for any transport layer, an inner product between a channel eigenvector and a code word corresponding to each beam of the transport layer is calculated to obtain a plurality of values; and a beam corresponding to the maximum value of the plurality of values is the strongest beam of the transport layer. The beam information associated with each of the K−m transport layers may be the same, or may be different.

For each of the K−m transport layers, the receive-end device can determine a precoding vector of the transport layer based on one piece of beam information associated with the transport layer and a polarization phase difference for constructing a precoding vector of the transport layer. Optionally, if the beam information associated with each of the K−m transport layers is the beam information of the strongest beam of the transport layer, for each of the K−m transport layers, the receive-end device determines a precoding vector of the transport layer based on the beam information of the strongest beam of the transport layer and the polarization phase difference for constructing a precoding vector of the transport layer.

For example, a precoding vector of a $y^{th}$ transport layer in the K−m transport layers may be represented as:

$$\begin{pmatrix} b_v \\ \phi b_v \end{pmatrix}.$$

$1 \le y \le K-m$, and y is an integer. $b_v$ is a beam of the $y^{th}$ transport layer in the K−m transport layers. $\phi$ is a polarization phase difference of the precoding vector of the $y^{th}$ transport layer in the K−m transport layers. In this application, the quantity of polarization directions of a channel is 2, and a polarization direction 0 and a polarization direction 1 are using as an example. The polarization phase difference is the phase difference of the channel in the two polarization directions.

The receive-end device can obtain a polarization phase difference for constructing the precoding vector of the $y^{th}$ transport layer in the K−m transport layers in a plurality of manners. Descriptions are provided as an example in the following.

Manner 1: A receive-end device pre-stores the following rule: a polarization phase difference for constructing a precoding vector of the $y^{th}$ transport layer in K−m transport layers is associated with a beam superposition coefficient of a beam $b_v$ of an $x^{th}$ transport layer in m transport layers, $1 \le x \le m$, and m is an integer. That the receive-end device pre-stores the rule may be understood that the receive-end device stores the rule before receiving codebook indication information of K transport layers. The rule may, for example, but is not limited to, be statically configured, for example, configured based on a protocol; or semi-statically configured, for example, configured by using radio resource control (RRC) signaling or medium access control (MAC) signaling.

Polarization phase differences of precoding vectors of different transport layers in K−m transport layers may be associated with beam superposition coefficients of different transport layers in m transport layers, or may be associated with the beam superposition coefficient of the same transport layers in m transport layers. Specific examples can be referred to as follows.

In some embodiments of this application, to realize that the $y^{th}$ transport layer in the K−m transport layers is orthogonalized with the $x^{th}$ transport layer in the m transport layers, thereby reducing interference between the $y^{th}$ transport layer in the K−m transport layers and the $x^{th}$ transport layer in the m transport layers, the rule may be at least any one of the following:

$$\phi = -\frac{\alpha_{0,x,v}^{WB} p_{0,x,v}^{SB} c_{1,x,v}^{SB}}{\alpha_{1,x,v}^{WB} p_{1,x,v}^{SB} c_{0,x,v}^{SB}}. \qquad 1).$$

This example may be applied to a scenario in which a beam superposition coefficient includes a broadband amplitude coefficient, a narrowband amplitude coefficient and a narrowband phase coefficient.

$$\phi = -\frac{\alpha_{0,x,v}^{WB} c_{1,x,v}^{SB}}{\alpha_{1,x,v}^{WB} c_{0,x,v}^{SB}}. \qquad 2).$$

This example may be applied to a scenario in which a beam superposition coefficient includes a broadband amplitude coefficient, and a narrowband phase coefficient.

$$\phi = -\frac{p_{0,x,v}^{SB} c_{1,x,v}^{SB}}{p_{1,x,v}^{SB} c_{0,x,v}^{SB}}. \qquad 3).$$

This example may be applied to a scenario in which a beam superposition coefficient includes a narrowband amplitude coefficient and a narrowband phase coefficient.

$\alpha_{i,x,v}^{WB}$ is a broadband amplitude coefficient of a beam $b_v$ of a polarization direction i in the $x^{th}$ transport layer of the m transport layers, $p_{i,x,v}^{SB}$ is a narrowband amplitude coefficient of the beam $b_v$ of the polarization direction i of the $x^{th}$ transport layer in the m transport layers, and $c_{i,x,v}^{SB}$ is a narrowband phase coefficient of the beam $b_v$ of the polarization direction i of the $x^{th}$ transport layer of the m transport layers; i may be 0 or 1.

It should be noted that, theoretically, the $y^{th}$ transport layer in the K−m transport layers may be designed to be orthogonalized with any one of the m transport layers. Actually, the design may be performed based on requirements.

Manner 2: The codebook indication information of the K transport layers may include polarization phase difference information for constructing the precoding vector of the $y^{th}$ transport layer in the K−m transport layers. The polarization phase difference information is used to indicate a quantized value of the polarization phase difference, and the polarization phase difference may be, for example, but is not limited to, an index of the polarization phase difference. Other information included in the polarization phase difference information and the codebook indication information of K transport layers may be carried in a same message, to be transmitted, or may be carried in different messages, to be transmitted.

In this manner, the transmit-end device needs to obtain and send the polarization phase difference for constructing the precoding vector of the $y^{th}$ transport layer in the K−m transport layers. Specifically, the polarization phase difference may, for example, but not limited to, be obtained by any one of the following implementations:

1). A transmit-end device obtains a polarization phase difference for constructing a precoding vector of the $y^{th}$ transport layer in the K−m transport layers based on broadband channel information (for example, an eigenvector of the broadband channel) of the $y^{th}$ transport layer in the K−m transport layers. Specifically, the transmit-end device can obtain a plurality of vectors by respectively multiplying possible values of the channel polarization phase difference by $b_v$; and respectively calculating inner products between these vectors and the eigenvector of the broadband channel of the $y^{th}$ transport layer in the K−m transport layers, the obtained polarization phase difference corresponding to the maximum value is the polarization phase difference for constructing the precoding vector of the $y^{th}$ transport layer in the K−m transport layers. For example, assuming that a quantized bit of a polarization phase difference is 2, there are four possible values of the polarization phase difference, for example, 0, π/2, π and 3π/2. The four polarization phase differences are respectively multiplied by $b_v$ to obtain four vectors (which are respectively marked as vectors 0 to 3). The polarization phase difference 3π/2 is multiplied by $b_v$ to obtain a vector 2; and inner products between the four vectors and the eigenvector of the broadband channel of the $y^{th}$ transport layer in the K−m transport layers are respectively calculated to obtain four values. Assuming that the maximum value of the four values is a value obtained by calculating an inner product between the vector 2 and the eigenvector of the broadband channel of the $y^{th}$ transport layer in the K−m transport layers, the polarization phase difference 3π/2 used when the vector 2 is obtained is considered as the polarization phase difference for constructing the precoding vector of the $y^{th}$ transport layer in the K−m transport layers.

2). The transmit-end device obtains the polarization phase difference for constructing the precoding vector of the $y^{th}$ transport layer in the K−m transport layers based on narrowband channel information (for example, an eigenvector of the narrowband channel) of the $y^{th}$ transport layer. Specifically, for each narrowband, the transmit-end device can obtain the polarization phase difference in the narrowband for constructing the $y^{th}$ transport layer in the K−m transport layers based on the narrowband channel information of the narrowband. For a specific implementation process, refer to the foregoing manner in which polarization phase difference is obtained based on the broadband channel information. Details are not described herein again. In the manner, the polarization phase difference information for constructing the precoding vector of the $y^{th}$ transport layer of the codebook indication information of the K transport layers may be a polarization phase difference of each narrowband of the $y^{th}$ transport layer.

3). The transmit-end device obtains the polarization phase difference for constructing the precoding vector of the $y^{th}$ transport layer in the K−m transport layers based on the technical solution provided in Manner 1 in which the polarization phase difference for constructing the precoding vector of the $y^{th}$ transport layer in K−m transport layers is associated with the beam superposition coefficient of the beam $b_v$ of the $x^{th}$ transport layer in the m transport layers.

To describe in detail the implementation process of the channel state information feedback and receiving methods in this application, a more specific description will be provided as follows. For convenience of description, the m transport layers are marked as first-class transport layers, and the K−m transport layers are marked as second-class transport layers. Moreover, if a polarization phase difference of a precoding vector of one of the second-class transport layers is associated with a beam superposition coefficient of one of the m transport layers, the transport layer of the m transport layers is referred to as a reference transport layer of the second-class transport layers.

The following Embodiments 1 to 3 are described by using the following scenario as an example: the transport layer quantity K s is equal to 4, these four transport layers are respectively marked as transport layers 0 to 3; the beam quantity L is equal to 4, these four beams are respectively marked as $b_0$ to $b_3$; and m is equal to 2, these two transport layers are the transport layer 0 and the transport layer 1, and beam information associated with these two transport layers are beam information of $b_0$ to $b_3$.

Embodiment 1

Beam superposition coefficients of first-class transport layers included in codebook indication information of K transport layers may be, for example, but is not limited to, shown in Table 1:

TABLE 1

| Transport layer class | Transport layer | Beam | Polarization direction 0 | | | Polarization direction 1 | | |
| --- | --- | --- | --- | --- | --- | --- | --- | --- |
| | | | Broadband amplitude coefficient | Narrowband amplitude coefficient | Narrowband phase coefficient | Broadband amplitude coefficient | Narrowband amplitude coefficient | Narrowband phase coefficient |
| First-class transport layer | Transport layer 0 | $b_0$ | $\alpha_{0,0,0}^{WB}$ | $p_{0,0,0}^{SB}$ | $c_{0,0,0}^{SB}$ | $\alpha_{1,0,0}^{WB}$ | $p_{1,0,0}^{SB}$ | $c_{1,0,0}^{SB}$ |
| | | $b_1$ | $\alpha_{0,0,1}^{WB}$ | $p_{0,0,1}^{SB}$ | $c_{0,0,1}^{SB}$ | $\alpha_{1,0,1}^{WB}$ | $p_{1,0,1}^{SB}$ | $c_{1,0,1}^{SB}$ |
| | | $b_2$ | $\alpha_{0,0,2}^{WB}$ | $p_{0,0,2}^{SB}$ | $c_{0,0,2}^{SB}$ | $\alpha_{1,0,2}^{WB}$ | $p_{1,0,2}^{SB}$ | $c_{1,0,2}^{SB}$ |
| | | $b_3$ | $\alpha_{0,0,3}^{WB}$ | $p_{0,0,3}^{SB}$ | $c_{0,0,3}^{SB}$ | $\alpha_{1,0,3}^{WB}$ | $p_{1,0,3}^{SB}$ | $c_{1,0,3}^{SB}$ |
| | Transport layer 1 | $b_0$ | $\alpha_{0,1,0}^{WB}$ | $p_{0,1,0}^{SB}$ | $c_{0,1,0}^{SB}$ | $\alpha_{1,1,0}^{WB}$ | $p_{1,1,0}^{SB}$ | $c_{1,1,0}^{SB}$ |
| | | $b_1$ | $\alpha_{0,1,1}^{WB}$ | $p_{0,1,1}^{SB}$ | $c_{0,1,1}^{SB}$ | $\alpha_{1,1,1}^{WB}$ | $p_{1,1,1}^{SB}$ | $c_{1,1,1}^{SB}$ |
| | | $b_2$ | $\alpha_{0,1,2}^{WB}$ | $p_{0,1,2}^{SB}$ | $c_{0,1,2}^{SB}$ | $\alpha_{1,1,2}^{WB}$ | $p_{1,1,2}^{SB}$ | $c_{1,1,2}^{SB}$ |
| | | $b_3$ | $\alpha_{0,1,3}^{WB}$ | $p_{0,1,3}^{SB}$ | $c_{0,1,3}^{SB}$ | $\alpha_{1,1,3}^{WB}$ | $p_{1,1,3}^{SB}$ | $c_{1,1,3}^{SB}$ |

In this case, for the second-class transport layers, assuming that beam information associated with a transport layer 2 is beam information of $b_1$, and the transport layer 2 is orthogonalized with a transport layer 0; beam information associated with the transport layer 3 is beam information of $b_3$, and a transport layer 3 is orthogonalized with a transport layer 1, polarization phase differences of precoding vectors of the second-class transport layers are shown in Table 2:

TABLE 2

| Transport layer class | Transport layer | Reference transport layer | Beam indicated by associated beam information | Polarization phase difference for constructing precoding vector |
| --- | --- | --- | --- | --- |
| Second-class transport layer | Transport layer 2 | Transport layer 0 | $b_1$ | $\phi = -\dfrac{\alpha_{0,0,1}^{WB} p_{0,0,1}^{SB} c_{1,0,1}^{SB}}{\alpha_{1,0,1}^{WB} p_{1,0,1}^{SB} c_{0,0,1}^{SB}}$ |

TABLE 2-continued

| Transport layer class | Transport layer | Reference transport layer | Beam indicated by associated beam information | Polarization phase difference for constructing precoding vector |
| --- | --- | --- | --- | --- |
| | Transport layer 3 | Transport layer 1 | $b_3$ | $\phi = -\dfrac{\alpha_{0,1,3}^{WB} p_{0,1,3}^{SB} c_{1,1,3}^{SB}}{\alpha_{1,1,3}^{WB} p_{1,1,3}^{SB} c_{0,1,3}^{SB}}$ |

In this embodiment, the precoding vector of the transport layer 2 may be represented as $$\begin{pmatrix} b_0 \\ \phi b_0 \end{pmatrix} = \begin{pmatrix} \alpha_{0,0,1}^{WB} p_{0,0,1}^{SB} c_{1,0,1}^{SB} b_0 \\ -\alpha_{1,0,1}^{WB} p_{1,0,1}^{SB} c_{0,0,1}^{SB} b_0 \end{pmatrix}.$$

The precoding vector of the transport layer 3 may be represented as $$\begin{pmatrix} b_1 \\ \phi b_1 \end{pmatrix} = \begin{pmatrix} \alpha_{0,1,3}^{WB} p_{0,1,3}^{SB} c_{1,1,3}^{SB} b_1 \\ -\alpha_{1,1,3}^{WB} p_{1,1,3}^{SB} c_{0,1,3}^{SB} b_1 \end{pmatrix}.$$

Embodiment 2

Beam superposition coefficients of first-class transport layers included in codebook indication information of K transport layers may be, for example, but is not limited to, a table, shown in Table 3, obtained after narrowband amplitude coefficients are deleted.

In this case, for second-class transport layers, assuming that beam information associated with a transport layer 2 is beam information of $b_1$, and the transport layer 2 is orthogonalized with a transport layer 0; beam information associated with the transport layer 3 is beam information of $b_3$, and the transport layer 3 is orthogonalized with a transport layer 1, polarization phase differences of precoding vectors of the second-class transport layers are shown in Table 3:

TABLE 3

| Transport layer class | Transport layer | Reference transport layer | Beam indicated by associated beam information | Polarization phase difference for constructing precoding vector |
|---|---|---|---|---|
| Second-class transport layer | Transport layer 2 | Transport layer 0 | $b_1$ | $\phi = -\dfrac{p^{SB}_{0,0,1} c^{SB}_{1,0,1}}{p^{SB}_{1,0,1} c^{SB}_{0,0,1}}$ |
| | Transport layer 3 | Transport layer 1 | $b_3$ | $\phi = -\dfrac{p^{SB}_{0,1,3} c^{SB}_{1,1,3}}{p^{SB}_{1,1,3} c^{SB}_{0,1,3}}$ |

In this embodiment, the precoding vector of the transport layer 2 may be represented as $$\begin{pmatrix} b_0 \\ \phi b_0 \end{pmatrix} = \begin{pmatrix} p^{SB}_{0,0,1} c^{SB}_{1,0,1} b_0 \\ -p^{SB}_{1,0,1} c^{SB}_{0,0,1} b_0 \end{pmatrix}.$$

The precoding vector of the transport layer 3 may be represented as $$\begin{pmatrix} b_1 \\ \phi b_1 \end{pmatrix} = \begin{pmatrix} p^{SB}_{0,1,3} c^{SB}_{1,1,3} b_1 \\ -p^{SB}_{1,1,3} c^{SB}_{0,1,3} b_1 \end{pmatrix}.$$

Embodiment 3

Beam superposition coefficients of first-class transport layers included in codebook indication information of K transport layers may be, for example, but is not limited to, a table, shown in Table 3, obtained after broadband amplitude coefficients are deleted.

In this case, for the second-class transport layers, assuming that beam information associated with a transport layer 2 is beam information of $b_1$, and the transport layer 2 is orthogonalized with a transport layer 0; beam information associated with a transport layer 3 is beam information of $b_3$, and the transport layer 3 is orthogonalized with a transport layer 1, polarization phase differences of precoding vectors of the second-class transport layers are shown in Table 4:

TABLE 4

| Transport layer class | Transport layer | Reference transport layer | Beam indicated by associated beam information | Polarization phase difference for constructing precoding vector |
|---|---|---|---|---|
| Second-class transport layer | Transport layer 2 | Transport layer 0 | $b_1$ | $\phi = -\dfrac{p^{SB}_{0,0,1} c^{SB}_{1,0,1}}{p^{SB}_{1,0,1} c^{SB}_{0,0,1}}$ |
| | Transport layer 3 | Transport layer 1 | $b_3$ | $\phi = -\dfrac{p^{SB}_{0,1,3} c^{SB}_{1,1,3}}{p^{SB}_{1,1,3} c^{SB}_{0,1,3}}$ |

In this embodiment, the precoding vector of the transport layer 2 may be represented as $$\begin{pmatrix} b_0 \\ \phi b_0 \end{pmatrix} = \begin{pmatrix} p^{SB}_{0,0,1} c^{SB}_{1,0,1} b_0 \\ -p^{SB}_{1,0,1} c^{SB}_{0,0,1} b_0 \end{pmatrix}.$$

The precoding vector of the transport layer 3 may be represented as $$\begin{pmatrix} b_1 \\ \phi b_1 \end{pmatrix} = \begin{pmatrix} p^{SB}_{0,1,3} c^{SB}_{1,1,3} b_1 \\ -p^{SB}_{1,1,3} c^{SB}_{0,1,3} b_1 \end{pmatrix}.$$

Embodiment 4

In the foregoing Embodiments 1 to 3, the example in which the quantity of pieces of beam information associated with each of the first-class transport layers is L is used for description. During actual implementation, the quantity of pieces of beam information associated with some of m transport layers is less than L. For example, the quantity of transport layers is equal to 4, and these four transport layers are respectively marked as transport layers 0 to 3; the beam quantity L is equal to 4, and these four beams are respectively marked as $b_0$ to $b_3$; and beams indicated by beam information associated with each of the K transport layers are shown in Table 5:

TABLE 5

| Transport layer | Beam indicated by associated beam information |
|---|---|
| Transport layer 0 | $b_0$ to $b_3$ |
| Transport layer 1 | $b_0$ to $b_2$ |
| Transport layer 2 | $b_0$ to $b_1$ |
| Transport layer 3 | $b_0$ |

In this example, for an implementation of the beam superposition coefficient and the polarization phase difference of the precoding vector of transport layer 3, refer to any one of Embodiments 1 to 3.

Embodiment 5

In Embodiments 1 to 3, polarization phase differences of precoding vectors of different transport layers in the second-class transport layers are determined based on beam superposition coefficients of beams of different transport layers in the first-class transport layers. In this embodiment, polarization phase differences of a precoding vector of each of the second-class transport layers are determined based on beam superposition coefficients of beams of the same transport layer in the first-class transport layers. In other words, a reference transport layer of each of the second-class transport layers is the same. A beam, of the reference transport layer, whose beam superposition coefficient is related to each of the second-class transport layers respectively is not limited in this application. An optional implementation is: first determining beam information associated with second-class transport layers with higher equivalent channel quality, and then determining beam information associated with second-class transport layers with lower equivalent channel quality. Moreover, when determining beam information associated with any second-class transport layer, beam information of the strongest beam of a group of beams of the reference transport layer is selected as the beam information associated with the second-class transport layers. The group of beams is a group of various beams, of the reference transport layer, that are not determined as beams indicated by beam information associated with the second-class transport layers. For example, assuming that the transport layer quantity K is equal to 4, these four transport layers are respectively marked as transport layers 0 to 3, and the transport layer 0 is a reference transport layer of transport layers 1, 2 and 3. The second-class transport layers sorted in descending order of equivalent channel quality as follows: the transport layer 1, the transport layer 2 and the transport layer 3. The beam information quantity L is equal to 4, and the four beams are respectively marked as $b_0$ to $b_3$. Beam information of the transport layer 0 is beam information of $b_0$ to $b_3$. For the transport layer 1, beam information of the strongest beam of $b_0$ to $b_3$ is used as beam information associated with the transport layer 1. Assuming that beam information associated with the transport layer 1 is beam information of $b_0$, for the transport layer 2, beam information of the strongest beam of $b_1$ to $b_3$ is used as beam information associated with the transport layer 2. Assuming that beam information associated with the transport layer 2 is beam information of $b_1$, for the transport layer 3, beam information of the strongest beam of $b_2$ to $b_3$ is used as beam information associated with the transport layer 3.

This embodiment uses the following scenario as an example: The transport layer quantity K is equal to 4, these four transport layers are respectively marked as transport layers 0 to 3; the quantity L of beams is equal to 4, these four beams are respectively marked as $b_0$ to $b_3$; m is equal to 1, and this transport layer is the transport layer 0. Therefore, beam superposition coefficients of first-class transport layers included in codebook indication information of K transport layers may be shown in Table 6:

TABLE 6

| Transport layer type | Transport layer | Beam | Polarization direction 0 | | | Polarization direction 1 | | |
| --- | --- | --- | --- | --- | --- | --- | --- | --- |
| | | | Broadband amplitude coefficient | Narrowband amplitude coefficient | Narrowband phase coefficient | Broadband amplitude coefficient | Narrowband amplitude coefficient | Narrowband phase coefficient |
| First-class transport layer | Transport layer 0 | $b_0$ | $\alpha^{WB}_{0,0,0}$ | $p^{SB}_{0,0,0}$ | $c^{SB}_{0,0,0}$ | $\alpha^{WB}_{1,0,0}$ | $p^{SB}_{1,0,0}$ | $c^{SB}_{1,0,0}$ |
| | | $b_1$ | $\alpha^{WB}_{0,0,1}$ | $p^{SB}_{0,0,1}$ | $c^{SB}_{0,0,1}$ | $\alpha^{WB}_{1,0,1}$ | $p^{SB}_{1,0,1}$ | $c^{SB}_{1,0,1}$ |
| | | $b_2$ | $\alpha^{WB}_{0,0,2}$ | $p^{SB}_{0,0,2}$ | $c^{SB}_{0,0,2}$ | $p^{SB}_{1,0,2}$ | $p^{SB}_{1,0,2}$ | $c^{SB}_{1,0,2}$ |
| | | $b_3$ | $\alpha^{WB}_{0,0,3}$ | $p^{SB}_{0,0,3}$ | $c^{SB}_{0,0,3}$ | $p^{SB}_{1,0,3}$ | $p^{SB}_{1,0,3}$ | $c^{SB}_{1,0,3}$ |

In this case, for the second-class transport layers, transport layers 1, 2 and 3 are all orthogonalized with the transport layer 1. Assuming that beam information associated with the transport layer 1 is beam information of $b_0$, beam information associated with the transport layer 2 is beam information of $b_1$, beam information associated with the transport layer 3 is beam information of $b_2$, polarization phase differences of precoding vectors of the second-class transport layers are shown in Table 7:

TABLE 7

| Transport layer class | Transport layer | Reference transport layer | Beam indicated by associated beam information | Polarization phase difference for constructing precoding vector |
| --- | --- | --- | --- | --- |
| Second-class transport layer | Transport layer 1 | Transport layer 0 | $b_0$ | $\phi = -\dfrac{\alpha^{WB}_{0,0,0} p^{SB}_{0,0,0} c^{SB}_{1,0,0}}{\alpha^{WB}_{1,0,0} p^{SB}_{1,0,0} c^{SB}_{0,0,0}}$ |
| | Transport layer 2 | | $b_1$ | $\phi = -\dfrac{\alpha^{WB}_{0,0,1} p^{SB}_{0,0,1} c^{SB}_{1,0,1}}{\alpha^{WB}_{1,0,1} p^{SB}_{1,0,1} c^{SB}_{0,0,1}}$ |
| | Transport layer 3 | | $b_2$ | $\phi = -\dfrac{\alpha^{WB}_{0,0,2} p^{SB}_{0,0,2} c^{SB}_{1,0,2}}{\alpha^{WB}_{1,0,2} p^{SB}_{1,0,2} c^{SB}_{0,0,2}}$ |

In this embodiment, each of transport layers 1, 2 and 3 is orthogonalized with the transport layer 0 by designing a polarization phase difference of a precoding vector of each of the transport layers 1, 2 and 3. In addition, because beams of any two of the transport layers 1, 2 and 3 are different, any two of the transport layers 1, 2 and 3 are orthogonalized with each other. In summary, this embodiment helps implement pairwise orthogonalization of all transport layers, thereby well reducing interference between transport layers.

It should be noted that, in this embodiment, the quantity of transport layers in first-class transport layers is 1, that is, m=1 is used as an example for description. In this example, to ensure that each of the second-class transport layers is orthogonalized with the first-class transport layer, generally, beams associated with different transport layers in the second-class transport layers are different. During actual implementation, m may be greater than 1.

It should be noted that, some or all features of a plurality of embodiments provided above may be recombined to construct a new embodiment in a non-conflict case. Details are not described herein again.

In some embodiments of this application, the quantity of pieces of beam information associated with each of K transport layers is greater than or equal to 2. In other words, 2≤a quantity of pieces of beam information associated with at least one of the K transport layers<L, and a quantity of pieces of beam information associated with each of other transport layers is equal to L. For example, the transport layer quantity K is equal to 4, and these four transport layers are respectively marked as transport layers 0 to 3; the beam quantity L is equal to 4, and these four beams are respectively marked as $b_0$ to $b_3$; beams indicated by beam information associated with each of K transport layers are shown in Table 8:

TABLE 8

| Transport layer | Beam indicated by associated beam information |
| --- | --- |
| Transport layer 0 | $b_0$ to $b_3$ |
| Transport layer 1 | $b_0$ to $b_3$ |
| Transport layer 2 | $b_0$ to $b_3$ |
| Transport layer 3 | $b_0$ to $b_2$ |

In this embodiment, the precoding vector of each of the K transport layers is constructed by using at least two beams.

Therefore, for each of the K transport layers, it is considered that the precoding vector of the transport layer is obtained by using a beam combining technology. In this embodiment, first-class transport layers and second-class transport layer are no longer distinguished, or it can be considered that K transport layers are all first-class transport layers.

In this embodiment, for each of the K transport layers, the receive-end device can determine a precoding vector of the transport layer based on at least two pieces of beam information associated with the transport layer and a beam superposition coefficient of the transport layer. For an obtaining method of a beam superposition coefficient of each transport layer, for example, refer to the above, but this embodiment is not limited thereto, and details are not described herein again.

With reference to FIG. 1 to FIG. 2, Table 1 to Table 8 describe the channel state information feedback method and receiving method provided in the embodiments of this application from the perspective of method implementation. It should be understood that the operations or operations shown in the methods of various embodiments above are merely examples, or other operations or variations of various operations may be performed. Moreover, In one embodiment, various operations may also be performed in a sequence different from that described in the embodiments of this application, and it is possible that all operations or operations shown in the embodiments of this application are not performed. Alternatively, more operations or operations that those shown in the embodiments of this application are performed. It should also be understood that sequence numbers of the foregoing processes do not mean execution sequences in various embodiments of this application. The execution sequences of the processes should be determined according to functions and internal logic of the processes, and should not be construed as any limitation to implementation processes of the embodiments of this application.

In one embodiment, the transmit-end device may be a network device, for example, a base station, or may be a terminal. The receive-end device may be a terminal, or may be a network device, for example, a base station.

The transmit-end device and the receive-end device provided by the embodiments of this application are described in the following. In one embodiment, the transmit-end device in this application may be a terminal and the receive-end device may be a network device.

Figure 3:
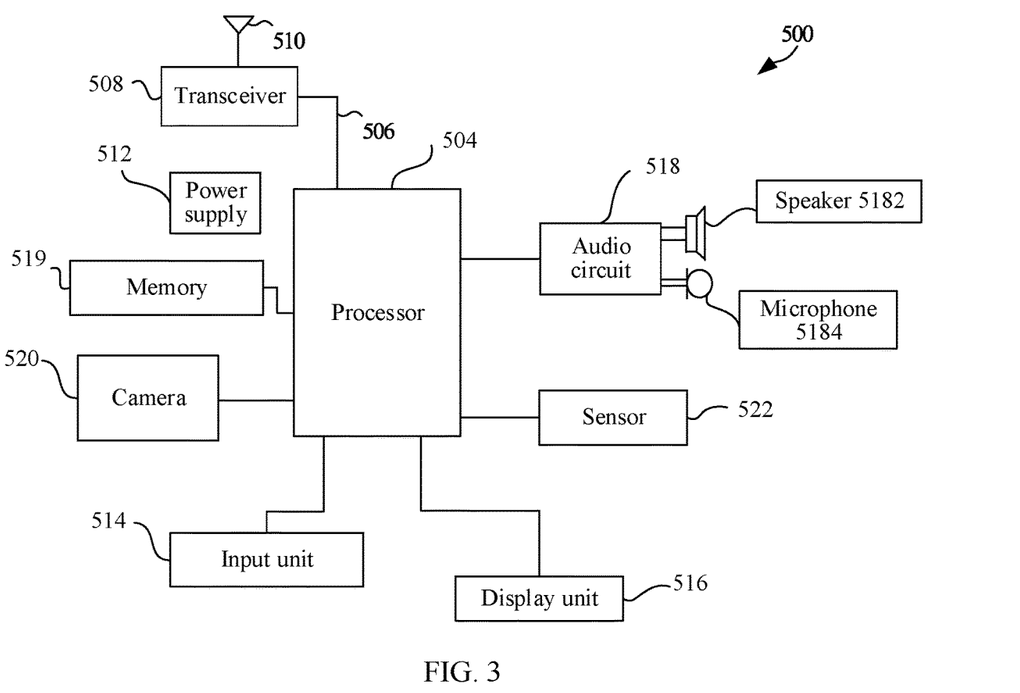
FIG. 3 is a schematic structural diagram of a transmit-end device according to this application.

FIG. 3 shows a terminal 500 according to an embodiment of this application, including at least a processor 504 and a transceiver 508.

The processor 504 is configured to generate codebook indication information of K transport layers, where K is an integer greater than or equal to 2; the codebook indication information of the K transport layers includes: L pieces of beam information used by the K transport layers, and indication information used to indicate beam information associated with each of the K transport layers; L is an integer greater than or equal to 2, and a quantity of pieces of beam information associated with at least one of the K transport layers is less than L.

The transceiver 508 is configured to send the codebook indication information of the K transport layers generated by the processor.

In a possible design, in the codebook indication information of the K transport layers sent by the transceiver 508, the quantity of pieces of beam information associated with each of K transport layers is greater than or equal to 2.

In another possible design, in the codebook indication information of the K transport layers sent by the transceiver 508, and in m transport layers in K transport layers, the quantity of pieces of beam information of each layer is greater than or equal to 2, where m is greater than or equal to 1 and is an integer less than K; and the quantity of pieces of beam information associated with K−m transport layers in the K transport layers other than the m transport layers is equal to 1.

In one embodiment, the quantity of pieces of beam information associated with each of the m transport layers is equal, or quantities of pieces of beam information associated with at least two of the m transport layers are not equal. Optionally, the quantity of pieces of beam information associated with each of m transport layers is L. Optionally, quantities of pieces of beam information associated with some of m transport layers are less than L.

In one embodiment, for each of the K−m transport layers, beam information associated with the transport layer is beam information of a strongest beam.

In one embodiment, for each of the K−m transport layers, a polarization phase difference for constructing a precoding vector of the transport layer is associated with a beam superposition coefficient of one of the m transport layers. Optionally, polarization phase differences of precoding vectors of different transport layers in K−m transport layers are associated with the beam superposition coefficient of the same transport layer in m transport layers.

In one embodiment, the codebook indication information of the K transport layers may also include: polarization phase difference information of the precoding vector of the K−m transport layers.

The transceiver 508 may be configured to perform actions of transmitting or sending by the terminal to the network device described in the foregoing method embodiments, and the processor 504 may be configured to perform actions implemented internally by the terminal described in the foregoing method embodiments. For details, refer to the descriptions in the foregoing method embodiments, and details are not described herein again.

The terminal may also include a memory 519, which stores a computer-executable instruction. The processor 504 and the memory 519 may be integrated as a processing device. The processor 504 is configured to perform a program code stored in the memory 519, to implement the foregoing function. In one embodiment, the memory 519 may alternatively be integrated in the processor 504.

The terminal may also include a power supply 512, configured to provide power supply for various components and circuits in the terminal. The terminal may further include an antenna 510, configured to send uplink data or uplink control signaling that is output by the transceiver 508 through radio signals.

In addition, to make a function of the terminal more perfect, the terminal may also include one or more of an input unit 514, a display unit 516, an audio circuit 518, a camera 520, and a sensor 522. The audio circuit may include a speaker 5182, a microphone 5184, or the like.

Figure 4:
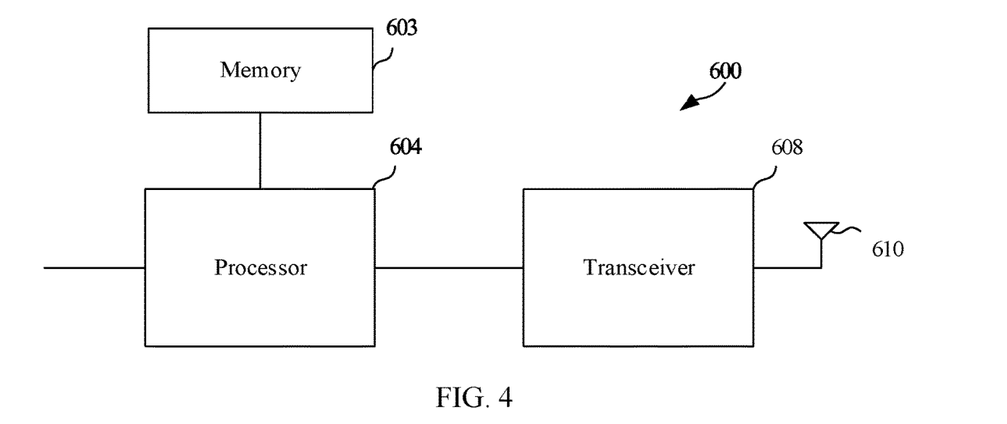
FIG. 4 is a schematic structural diagram of a receive-end device according to this application.

FIG. 4 shows a network device 600 according to an embodiment of this application, including at least a processor 604 and a transceiver 608.

The transceiver 608 is configured to receive codebook indication information of K transport layers, where K is an integer greater than or equal to 2; the codebook indication information of the K transport layers includes: L pieces of beam information used by the K transport layers, and indication information used to indicate beam information associated with each of the K transport layers; L is an integer greater than or equal to 2, and a quantity of pieces of beam information associated with at least one of the K transport layers is less than L.

The processor 604 is configured to determine a precoding vector of each of the K transport layers based on beam information associated with the K transport layers.

In one embodiment, the network device may also include a memory 603, configured to store the codebook indication information received by the transceiver 608 or store the precoding vector processed by the processor 604.

The processor 604 and the memory 603 may be combined into one processing apparatus, and the processor 604 is configured to perform a program code stored in the memory 603, to implement the foregoing function. In one embodiment, the memory 603 may also be integrated in the processor 604.

In a possible design, in the codebook indication information of the K transport layers received by the transceiver 608, the quantity of pieces of beam information associated with each of K transport layers is greater than or equal to 2. In this case, the processor 604 may be specifically configured to: for each of the K transport layers, determine a precoding vector of the transport layer based on at least two pieces of beam information associated with the transport layer and a beam superposition coefficient of the transport layer.

In another possible design, in the codebook indication information of the K transport layers received by the transceiver 608, and in m transport layers in K transport layers, the quantity of pieces of beam information of each layer is greater than or equal to 2, where m is greater than or equal to 1 and is an integer less than K; and the quantity of pieces of beam information associated with K−m transport layers in the K transport layers other than the m transport layers is equal to 1. In this case, optionally, the processor 604 may be specifically configured to: for each of the m transport layers, determine a precoding vector of the transport layer based on at least two pieces of beam information associated with the transport layer and a beam superposition coefficient of the transport layer. Optionally, the processor 604 may be specifically configured to: for each of the K−m transport layers, determine a precoding vector of the transport layer based on one piece of beam information associated with the transport layer and a polarization phase difference for constructing a precoding vector of the transport layer.

In one embodiment, in m transport layers, the quantity of pieces of beam information associated with each of the m transport layers is equal, or quantities of pieces of beam information associated with at least two of the m transport layers are not equal. In an embodiment, in m transport layers, the quantity of pieces of beam information associated with each layer is L. In this case, the processor 604 may be specifically configured to: for each of the m transport layers, determine a precoding vector of the transport layer based on L pieces of beam information associated with the transport layer and a beam superposition coefficient of the transport layer. In another embodiment, the quantity of pieces of beam information associated with at least one of the m transport layers is L, and the quantity of pieces of beam information associated with each of other transport layers is less than L. In this case, the processor 604 may be specifically configured to: for each of the at least one of the m transport layers, determine a precoding vector of the transport layer based on L pieces of beam information associated with the transport layer and a beam superposition coefficient of the transport layer; and for each of the other transport layers in the m transport layers, determine a precoding vector of the transport layer based on less than L pieces of beam information associated with the transport layer and a beam superposition coefficient of the transport layer.

In one embodiment, for each of the K−m transport layers, beam information associated with the transport layer is beam information of a strongest beam. In this case, the processor 604 may be specifically configured to: for each of the K−m transport layers, determine a precoding vector of the transport layer based on one piece of beam information of a strongest beam of the transport layer and a polarization phase difference for constructing a precoding vector of the transport layer.

In one embodiment, for each of the K−m transport layers, a polarization phase difference for constructing a precoding vector of the transport layer is associated with a beam superposition coefficient of one of the m transport layers. For example, but is not limited to: a polarization phase difference $\phi$ of a precoding vector of a $y^{th}$ transport layer in the K−m transport layers may be obtained by using any one of the following formulas:

$$\phi = -\frac{\alpha_{0,x,v}^{WB} p_{0,x,v}^{SB} c_{1,x,v}^{SB}}{\alpha_{1,x,v}^{WB} p_{1,x,v}^{SB} c_{0,x,v}^{SB}}, \phi = -\frac{\alpha_{0,x,v}^{WB} c_{1,x,v}^{SB}}{\alpha_{1,x,v}^{WB} c_{0,x,v}^{SB}}, \text{ and}$$

$$\phi = -\frac{p_{0,x,v}^{SB} c_{1,x,v}^{SB}}{p_{1,x,v}^{SB} c_{0,x,v}^{SB}};$$

$\alpha_{i,x,v}^{WB}$ is a broadband amplitude coefficient of a beam $b_v$ of a polarization direction i of an $x^{th}$ transport layer in the m transport layers, $p_{i,x,v}^{SB}$ is a narrowband amplitude coefficient of the beam $b_v$ of the polarization direction i of the $x^{th}$ transport layer in the m transport layers, and $c_{i,x,v}^{SB}$ is a narrowband phase coefficient of the beam $b_v$ of the polarization direction i of the $x^{th}$ transport layer in the m transport layers; i is 0 or 1; 0<x≤m, and 0<y≤K−m.

In one embodiment, a polarization phase difference of a precoding vector of each of the K−m transport layers is associated with the beam superposition coefficient of the same transport layer in m transport layers.

In one embodiment, the codebook indication information of the K transport layers may also include: polarization phase difference information of the precoding vector of the K−m transport layers.

The network device may further include an antenna 610, configured to send downlink data or downlink control signaling that is output by the transceiver 608.

It should be noted that the processor 504 of the terminal and the processor 604 of a network device may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 12 of the terminal and the memory 22 of the network device may include a volatile memory, for example, a random access memory (RAM), and may also include a non-volatile memory, for example, a flash memory, a hard disk drive (HDD), or a solid-state drive (SSD). The memory may further include a combination of the foregoing types of memories.

The network device in the device embodiments of this application may correspond to the network device in the method embodiments of this application, and the terminal may correspond to the terminal in the method embodiments of this application. Moreover, other operations and/or functions of each module in the network device and the terminal are respectively for implementing corresponding procedures of the method embodiments. For brevity, the description of the method embodiments of this application may be applicable to the device embodiments. Details are not described herein again.

For the beneficial effects of the device embodiments of this application, refer to the beneficial effects in the foregoing corresponding method embodiments. Details are not described herein again. In addition, for related content of the device embodiments of this application, refer to the foregoing corresponding method embodiments.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes various media that can store program code, for example: a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmit-end device, comprising:
a processor, configured to generate codebook indication information of K transport layers, wherein K is an integer greater than or equal to 2; wherein the codebook indication information comprises: L pieces of beam information used by the K transport layers, beam superposition coefficient information of at least one of m transport layers, and indication information used to indicate beam information associated with each of the K transport layers; wherein L is an integer greater than or equal to 2, and a quantity of pieces of beam information associated with at least one of the K transport layers is less than L to reduce a quantity of beam superposition coefficients that are fed back; and
a transceiver, configured to send the codebook indication information.

2. The transmit-end device according to claim 1, wherein in m transport layers of the K transport layers, a quantity of pieces of beam information associated with each layer is greater than or equal to 2, and m is an integer greater than or equal to 1 and less than K; and in K−m transport layers in the K transport layers other than the m transport layers, a quantity of pieces of beam information associated with each layer is equal to 1.

3. The transmit-end device according to claim 2, wherein for the m transport layers, the quantity of pieces of beam information associated with each layer is equal to L; or a quantity of pieces of beam information associated with at least one of the m transport layers is equal to L, and a quantity of pieces of beam information associated with each of other transport layers is less than L.

4. The transmit-end device according to claim 2, wherein for each of the K−m transport layers, beam information associated with the transport layer is beam information of a strongest beam of the transport layer.

5. The transmit-end device according to claim 2, wherein for one of the K−m transport layers, a polarization phase difference for constructing a precoding vector of the transport layer to be associated with a beam superposition coefficient of one of the m transport layers.

6. The transmit-end device according to claim 5, wherein a polarization phase difference for constructing a precoding vector of each of the K−m transport layers is associated with a beam superposition coefficient of the same transport layer in the m transport layers.

7. The transmit-end device according to claim 2, wherein the codebook indication information further comprises: polarization phase difference information for constructing precoding vectors of the K−m transport layers.

8. The transmit-end device according to claim 1, wherein a quantity of pieces of beam information associated with each of the K transport layers is greater than or equal to 2.

9. A method, comprising:
generating codebook indication information of K transport layers, wherein K is an integer greater than or equal to 2; wherein the codebook indication information comprises: L pieces of beam information used by the K transport layers, beam superposition coefficient information of at least one of m transport layers, and indication information used to indicate beam information associated with each of the K transport layers; wherein L is an integer greater than or equal to 2, and a quantity of pieces of beam information associated with at least one of the K transport layers is less than L to reduce a quantity of beam superposition coefficients that are fed back; and
sending the codebook indication information.

10. The method of claim 9, wherein in m transport layers of the K transport layers, a quantity of pieces of beam information associated with each layer is greater than or equal to 2, and m is an integer greater than or equal to 1 and less than K; and in K−m transport layers in the K transport layers other than the m transport layers, a quantity of pieces of beam information associated with each layer is equal to 1.

11. The method of claim 10, wherein for the m transport layers, the quantity of pieces of beam information associated with each layer is equal to L; or a quantity of pieces of beam information associated with at least one of the m transport layers is equal to L, and a quantity of pieces of beam information associated with each of other transport layers is less than L.

12. The method of claim 10, wherein for each of the K−m transport layers, beam information associated with the transport layer is beam information of a strongest beam of the transport layer.

13. The method of claim 10, wherein for one of the K−m transport layers, a polarization phase difference for constructing a precoding vector of the transport layer to be associated with a beam superposition coefficient of one of the m transport layers.

14. The method of claim 13, wherein a polarization phase difference for constructing a precoding vector of each of the K−m transport layers is associated with a beam superposition coefficient of the same transport layer in the m transport layers.

15. The method of claim 10, wherein the codebook indication information further comprises: polarization phase difference information for constructing precoding vectors of the K−m transport layers.

16. The method of claim 9, wherein a quantity of pieces of beam information associated with each of the K transport layers is greater than or equal to 21.

17. A non-transitory machine-readable medium having instructions stored therein, which when executed by a processor, cause the processor to perform operations, the operations comprising:
generating codebook indication information of K transport layers, wherein K is an integer greater than or equal to 2; wherein the codebook indication information comprises: L pieces of beam information used by the K transport layers, beam superposition coefficient information of at least one of m transport layers, and indication information used to indicate beam information associated with each of the K transport layers; wherein L is an integer greater than or equal to 2, and a quantity of pieces of beam information associated with at least one of the K transport layers is less than L to reduce a quantity of beam superposition coefficients that are fed back; and
sending the codebook indication information.

18. The machine-readable medium of claim 17, wherein in m transport layers of the K transport layers, a quantity of pieces of beam information associated with each layer is greater than or equal to 2, and m is an integer greater than or equal to 1 and less than K; and in K−m transport layers in the K transport layers other than the m transport layers, a quantity of pieces of beam information associated with each layer is equal to 1.

19. The machine-readable medium of claim 18, wherein for the m transport layers, the quantity of pieces of beam information associated with each layer is equal to L; or a quantity of pieces of beam information associated with at least one of the m transport layers is equal to L, and a quantity of pieces of beam information associated with each of other transport layers is less than L.

20. The machine-readable medium of claim 18, wherein for each of the K−m transport layers, beam information associated with the transport layer is beam information of a strongest beam of the transport layer.

* * * * *